(12) United States Patent
Garg et al.

(10) Patent No.: US 7,130,777 B2
(45) Date of Patent: Oct. 31, 2006

(54) METHOD TO HIERARCHICAL POOLING OF OPINIONS FROM MULTIPLE SOURCES

(75) Inventors: Ashutosh Garg, San Jose, CA (US); Jayram S. Thathachar, Morgan Hill, CA (US); Shivakumar Vaithyanathan, San Jose, CA (US); Huaiyu Zhu, Union City, CA (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 10/723,471

(22) Filed: Nov. 26, 2003

(65) Prior Publication Data

US 2005/0114161 A1 May 26, 2005

(51) Int. Cl.
*G06F 17/10* (2006.01)
(52) U.S. Cl. .............................. 703/2; 706/46; 706/52
(58) Field of Classification Search ................ 703/2; 702/181; 706/45, 46, 52; 434/322
See application file for complete search history.

(56) References Cited

U.S. PATENT DOCUMENTS

| | | | | | |
|---|---|---|---|---|---|
| 4,870,579 | A | * | 9/1989 | Hey | 705/27 |
| 6,125,340 | A | * | 9/2000 | Miles | 702/181 |
| 7,050,935 | B1 | * | 5/2006 | Draber | 702/181 |

OTHER PUBLICATIONS

Wallsten et al., Comparing the Calibration and Coherence of Numerical and Verbal Judgements, Management Science, Feb. 1993, Issue 2, p. 176-190.*

"Hierarchial Opinion Pools: OLAP for Unstructured Data", T.S. Jayram, Shivakumar Vaithyanathan, Huaiyu Zhu, Almaden Research Center, San Jose, CA 95120, Mar. 25, 2003, pp. 1-14.

"A Probabilistic Framework for Multi-agent Distributed Interpretation and Optimization of Communication", Yang Xiang, Proceedings of the TIME-94 International Workshop on Temporal Representation and Reasoning, Sep. 9, 1994, pp. 1-42.

"A Gentle Tutorial of the EM Algorithm and its Application to Parameter Estimation for Gaussian Mixture and Hidden Markov Models", Jeff A. Blimes, International Computer Science Institute, Berkeley, CA and Computer Science Division, Dept. of Electrical Engineering and Computer Science, U.C. Berkeley, Apr. 1998, 8 pages.

"Graphical Representations of Consensus Belief", David M. Pennock, Michael P. Wellman, AI Proceedings of the Fifteenth Conference on Uncertainty in Artificial Intelligence (UAI-99) pp. 531-540, Morgan Kaufmann, San Francisco, 1999.

(Continued)

*Primary Examiner*—Albert W. Paladini
(74) *Attorney, Agent, or Firm*—Gibb I.P. Law Firm, LLC; Marc McSwain, Esq.

(57) ABSTRACT

Disclosed is a system, method, and program storage device of aggregating opinions comprising consolidating a plurality of expressed opinions on various dimensions of topics as discrete probability distributions, generating an aggregate opinion as a single point probability distribution by minimizing a sum of weighted divergences between a plurality of the discrete probability distributions, and presenting the aggregate opinion as a Bayesian network, wherein the divergences comprise Kullback-Liebler distance divergences, and wherein the expressed opinions are generated by experts and comprise opinions on sentiments of products and services. Moreover, the aggregate opinion predicts success of the products and services. Furthermore, the experts are arranged in a hierarchy of knowledge, wherein the knowledge comprises the various dimensions of topics for which opinions may be expressed upon.

29 Claims, 7 Drawing Sheets

OTHER PUBLICATIONS

"Thumbs Up? Sentiment Classification using Machine Learning Techniques", Bo Pang, Lillian Lee, Shivakumar Vaithyanathan, Proc. 2002 Conf. on Empirical Methods in Natural Language Processing (EMNLP), 8 pages.

"Aggregating Learned Probabilistic Beliefs", Pedrito Maynard-Reid II, Urszula Chajewska, Uncertainty in Artificial Intelligence 17 (UAI '01), 354-361, 2001.

"The EM Algorithm", University of Pennsylvania, http://www-stat.wharton.upenn.edu/~bob/stat540/EM.pdf, 2001.

"CSE 291 Lecture Notes", University of California, San Diego, http://www.cs.ucsd.edu/users/elkan/291/nov27.html.

"Methods for combining experts' probability assessments", Neural Computation, Abstracts, vol. 7, 867-888, 1995, http://neco.mitpress.org/cgi/content/abstract/7/5/867?maxtoshow=&Hits=10&hits+10&Resultform . . . .

"MindfulEye Launches InvestorLite", DSstar, Aug. 28, 2003, http://www.hpcwire.com/dsstar/01/0327/102852.html, 1 page.

"No, this scheme isn't gobbledegook", Hugh Anderson, Financial Post, National Post Online, Dec. 23, 2000, http://www.sfu.ca/~mtaboada/National_Post_Online_Search_Results_Story.htm, 2 pages.

* cited by examiner

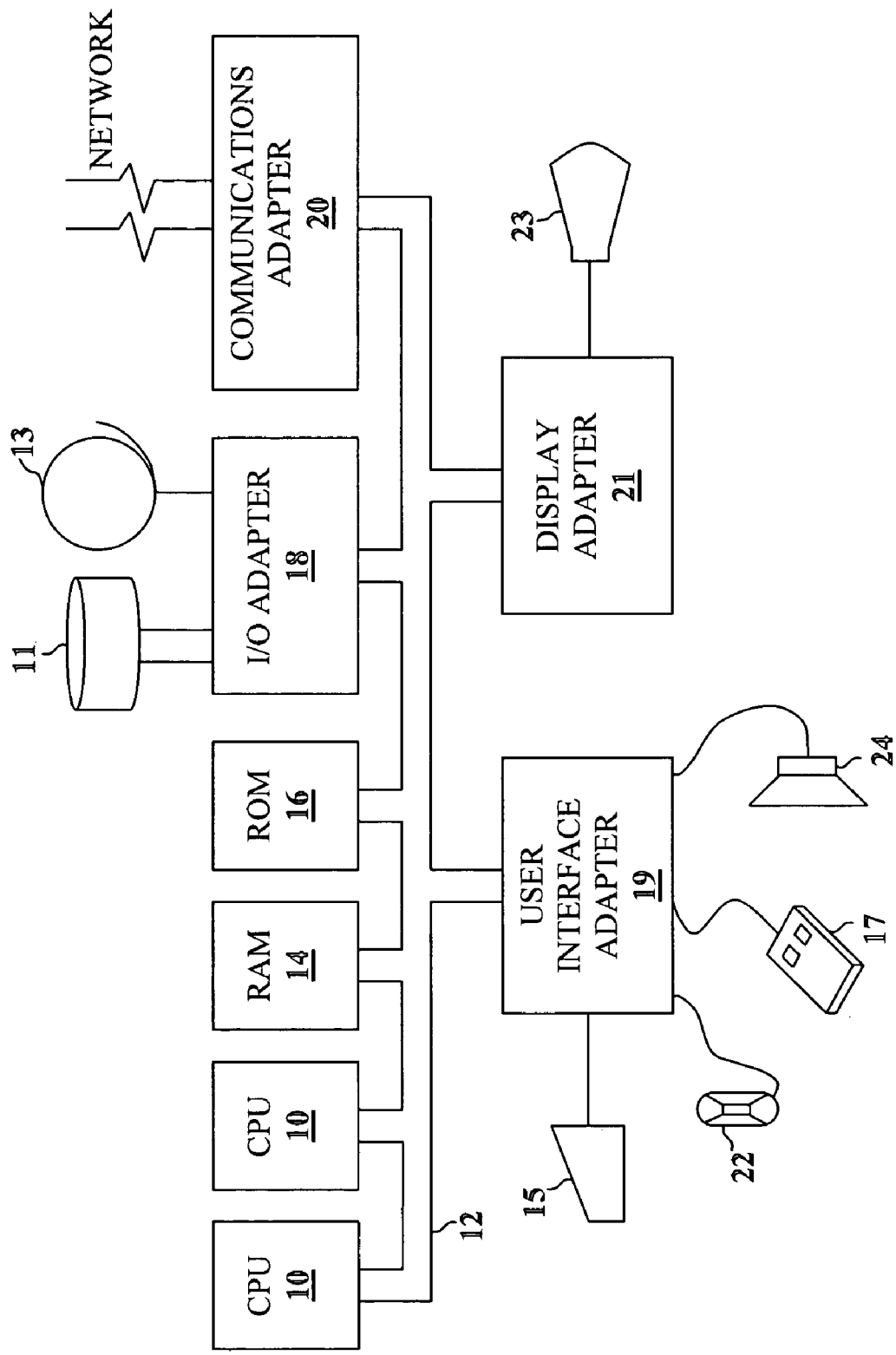

METHOD TO HIERARCHICAL POOLING OF OPINIONS FROM MULTIPLE SOURCES

BACKGROUND OF THE INVENTION

1. Field of the Invention

The invention generally relates to opinion processing, and more particularly to opinion pooling from sources of unstructured data.

2. Description of the Related Art

Within this application several publications are referenced by Arabic numerals within brackets. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

Business intelligence (BI) reporting of structured data involves presenting summaries of the data across different axes. For example, a query that can be answered by such a reporting tool is "Show sales of different products by Region and Date." Moreover summaries are required at different levels of granularity of the axes. Online Analytic Processing (OLAP) is a popular interactive reporting paradigm that enables the slicing and dicing of structured data. Queries such as the above can be answered using such a tool. The axes (such as region) are called dimensions and the reported figures (such as sales) are called measures. A hierarchical arrangement of the axes enables the tool to provide summaries at different levels. For example, both the Region dimension and the Date dimension could be hierarchies and summaries at different levels of each hierarchy may be requested by the user.

However, one of the untreated problems relating to opinion pooling remains the problem of BI reporting from unstructured textual data. Unlike structured data the inherent uncertainty in text provides interesting challenges in the reporting of, for example, the consensus of opinions across different dimensions. As an example consider a query such as "Show the opinion of different products by Source and Date."

There has been an explosion of opinion sites on the world wide web. Besides, opinion sites, users constantly express opinions in free text either on web-pages, web-logs, chat rooms, newsgroups, bulletin boards, etc. These opinions are very valuable feedback for market research, products, customer consumption, and in general all forms of business intelligence. Besides opinions, there are also other aspects in unstructured text that are of use. For example, it may be possible to extract severity expressed in text. Various conventional opinion pooling solutions have been proposed[1-4] using popular aggregation operators such as LinOp (linear opinion pool) and LogOp (logarithmic opinion pool).

However, once all of the above information has been extracted, it needs to be reported. This reporting should allow the extraction of the opinions or any other measures extracted from text across multiple dimensions, which the conventional approaches do not provide. Therefore, due to the limitations of the conventional approaches there is a need for a novel OLAP-like interactive tool to enable this extraction of the required measure.

SUMMARY OF THE INVENTION

In view of the foregoing, an embodiment of the invention provides a method and program storage device of aggregating opinions, the method comprising consolidating a plurality of expressed opinions on various dimensions of topics as discrete probability distributions, generating an aggregate opinion as a single point probability distribution by minimizing a sum of weighted divergences between a plurality of the discrete probability distributions, and presenting the aggregate opinion as a Bayesian network, wherein the divergences comprise Kullback-Liebler distance divergences, and wherein the expressed opinions are generated by experts and comprise opinions on sentiments of products and services. Moreover, the aggregate opinion predicts success of the products and services. Furthermore, the experts are arranged in a hierarchy of knowledge, wherein the knowledge comprises the various dimensions of topics for which opinions may be expressed upon.

In another embodiment, the invention provides a system for aggregating opinions comprising means for consolidating a plurality of expressed opinions on various dimensions of topics as discrete probability distributions, and means for generating an aggregate opinion as a single point probability distribution by minimizing a sum of weighted divergences between a plurality of the discrete probability distributions.

Specifically, the system comprises a network operable for consolidating a plurality of expressed opinions on various dimensions of topics as discrete probability distributions, and a processor operable for generating an aggregate opinion as a single point probability distribution by minimizing a sum of weighted divergences between a plurality of the discrete probability distributions, wherein the processor presents the aggregate opinion as a Bayesian network.

The invention provides a probabilistic framework that enables the providing of a consensus of the opinions or other measures over hierarchies and multiple dimensions in a consistent fashion. The inherent uncertainty is retained in simple probability distributions. These distributions are combined to give consensus opinions. Further, the system uses information from different sources to identify similarities between sources. This has two distinct advantages. The first advantage is the ability to obtain better estimates of consensus opinions, and the second advantage is the sparse data that is accounted for by using sources that are similar. Moreover, the source can be replaced by other dimensions and a consensus over multiple dimensions can be used to obtain consensus opinions.

These, and other aspects and advantages of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

The invention will be better understood from the following detailed description with reference to the drawings, in which:

FIG. 8 is a system diagram according to an embodiment of the invention.

DETAILED DESCRIPTION OF PREFERRED EMBODIMENTS OF THE INVENTION

Figure 1:
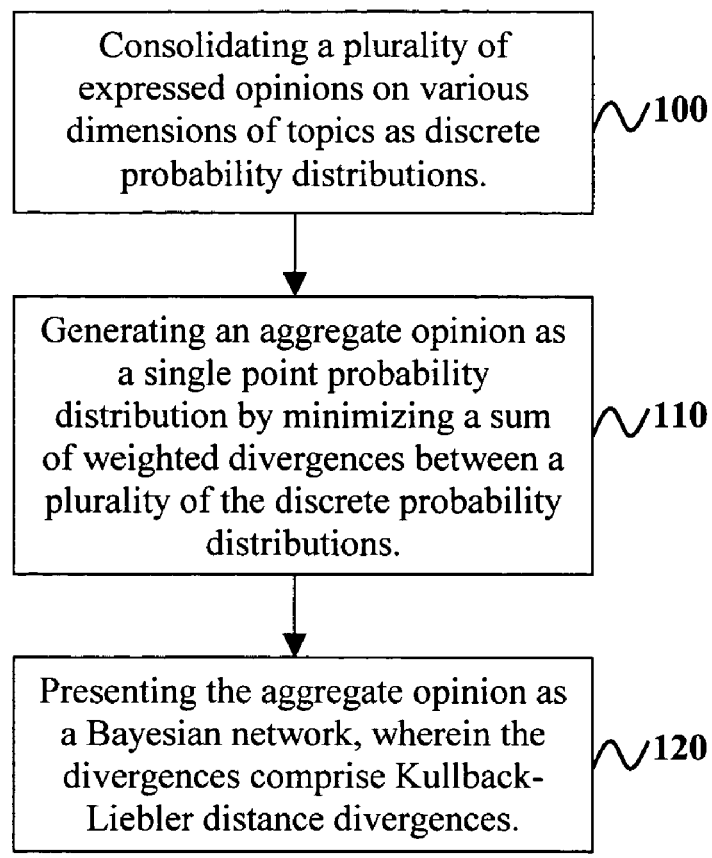
FIG. 1 is a flow diagram illustrating a preferred method of the invention.
Figure 2:
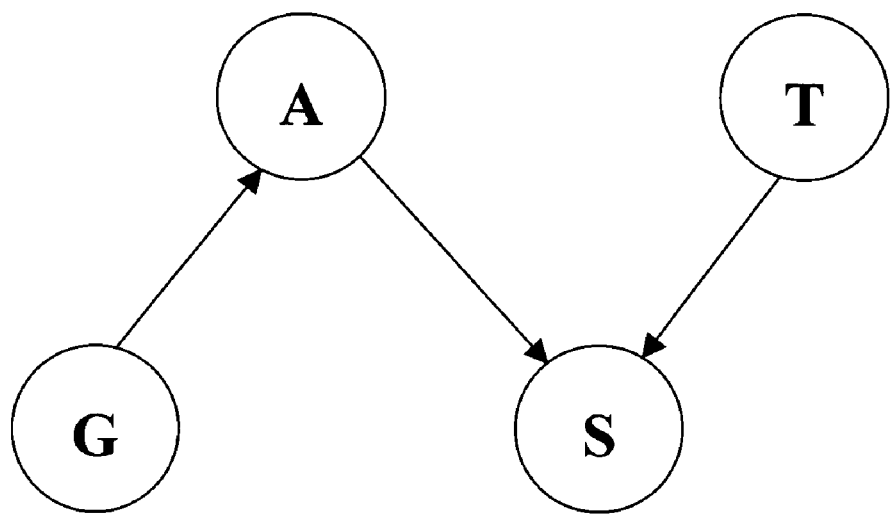
FIG. 2 is a schematic diagram of a Bayesian Network illustrating the conditional dependencies for opinion pooling according to an embodiment of the invention.
Figure 3:
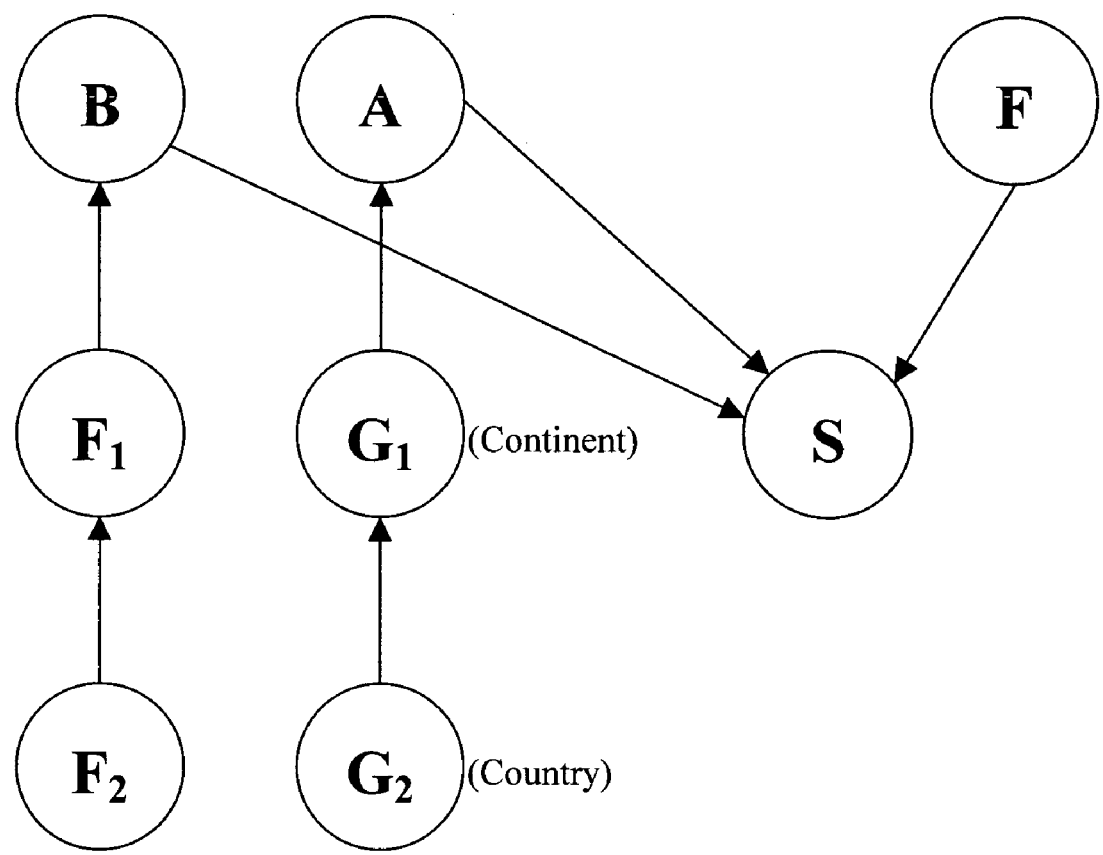
FIG. 3 is a schematic diagram of a Bayesian Network with multiple extrinsic variables in a hierarchy in the context of opinion pooling according to an embodiment of the invention.
Figure 4:
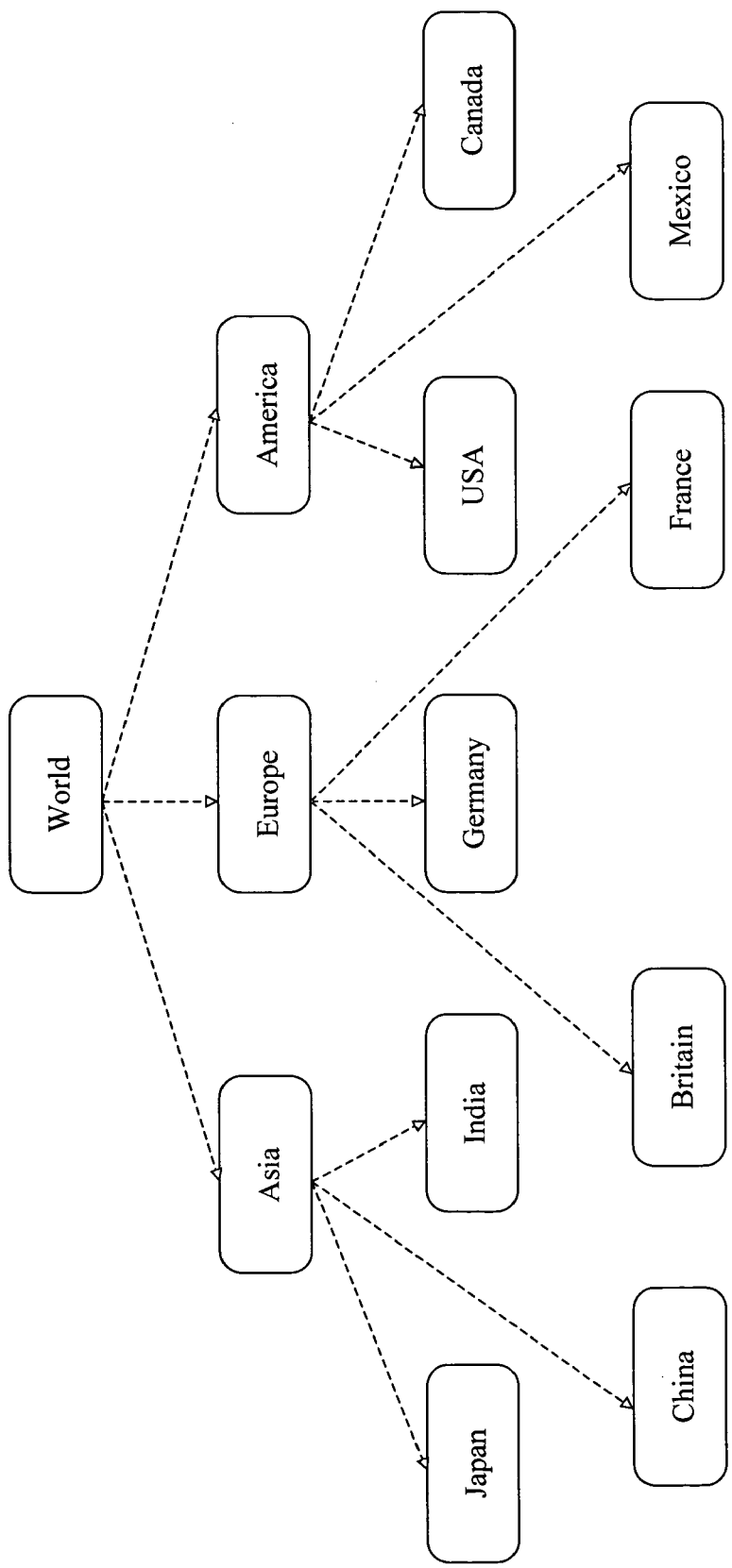
FIG. 4 schematic diagram of an example of an hierarchy for source dimension in the context of opinion pooling according to an embodiment of the invention.

The invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the invention. The examples used herein are intended merely to facilitate an understanding of ways in which the invention may be practiced and to further enable those of skill in the art to practice the invention. Accordingly, the examples should not be construed as limiting the scope of the invention.

As mentioned, the inherent uncertainty in text and unstructured data, in general, does not allow for an easy mechanism to pool data. The invention provides such a representation by using probability distributions over the required measure (e.g., high and low for sentiment). Moreover, the invention solves the above-identified problem by using a framework that enables the handling of these probability distributions, merging them, combining them and performing all of these in a consistent fashion. Referring now to the drawings and more particularly to FIGS. 1 through 8, there are shown preferred embodiments of the invention.

FIG. 1 illustrates a flow diagram of a method of aggregating opinions comprising consolidating 100 a plurality of expressed opinions on various dimensions of topics as discrete probability distributions, generating 110 an aggregate opinion as a single point probability distribution which is represented as a Bayesian network, while minimizing a sum of weighted divergences between a plurality of the discrete probability distributions, wherein the divergences comprise Kullback-Liebler distance divergences, and wherein the expressed opinions are generated by experts and comprise opinions on sentiments of products and services. Moreover, the aggregate opinion predicts success of the products and services. Furthermore, the experts are arranged in a hierarchy of knowledge, wherein the knowledge comprises the various dimensions of topics for which opinions may be expressed upon.

In other words, the invention provides a method of pooling opinions comprising representing a plurality of expressed opinions received from a plurality of sources on various dimensions of topics as discrete probability distributions, creating a single point probability distribution by minimizing a sum of weighted divergences between a plurality of the discrete probability distributions, and generating an aggregate opinion based on the single point probability distribution.

Essentially, the invention allows multiple opinions provided from a wide variety of sources, covering different dimensions of categories, and collectively pools them together into a cohesive aggregate opinion. The novelty of the invention, among other features, stems from the use of probability distributions representing the different opinions, and using a weighted divergence between the probability distributions; that is the differences between the opinions, to arrive at a consensus opinion. An example of how the invention works is as follows. Suppose experts provide various opinions on the various features of several different types of laptop computers. For example, some experts provide opinions on the processor speed, other focus their opinions on storage capabilities, while others express opinions on the weight characteristics of the laptop computer. The invention is able to pool all of these different opinions (covering different dimensions of the characteristics of a laptop computer) and is able to provide a cohesive singular opinion on a particular laptop computer. This single opinion thus allows for a prediction on product success if used in market research analysis. Thus, the invention provides a powerful business tool, which allows businesses to gather market intelligence on existing products and developing products.

The invention solves the problem of obtaining consensus opinions from multiple sources in the context of business intelligence. To begin with, a generalized operator for opinion pooling is defined as follows. Opinion pooling can be embodied as a minimization problem where a consensus opinion is obtained as the distribution that has the smallest distance from all the expert opinions. The invention uses a model-based opinion pooling approach. For example, the invention uses a statistical model embodied as a Bayesian Network (BN). Moreover, the invention provides an expectation maximization methodology, which learns the parameters of the resultant network.

The invention utilizes several concepts from probability and information theory. The capital letters X, Y refer to random variables and the corresponding lowercase letters x, y denotes the particular instantiation (value taken) by these. P(•) denotes a probability distribution. P(X=x) refers to the probability that random variable X takes on value x. For simplification, this quantity is denoted simply by P(x). $\hat{P}$ refers to the empirical distributions either computed from data or available from some experts. Corresponding subscripts refer to indexes from different experts. The term "sentiment" refers to the probability distributions over the space on which sentiments are found (denoted by S). In this case, the superscript refers to the particular value assigned to random variable S; i.e., $\hat{P}^k = \hat{P}(S=k)$.

According to the invention, in an opinion pooling framework, experts express their individual opinions of a certain topic T and a consensus opinion is required. These opinions are expressed as probability distributions over some space.

For example, while reviewing a movie, the distribution may be over integers from 1 to 10 where 1 represents a bad movie and 10 represents a great movie. $\hat{P}_i$ denotes the opinion of expert i and P is the the consensus opinion. The pooling operator maps the individual distributions to a consensus distribution defined on the same space:

$$P = F(\hat{P}_1, \hat{P}_2, \ldots, \hat{P}_n) \quad (1)$$

A generic objective function is used to obtain the aggregated distribution from individual opinions. Opinion pooling is presented below as a minimization problem. Given n expert distributions $\hat{P}_i$, their respective weights $w_i$ and a divergence D, where D satisfies $D(P,Q) \geq 0$ and $D(P,Q)=0 \Leftrightarrow P=Q$, it follows:

$$P = F(\hat{P}_1, \hat{P}_2, \ldots, \hat{P}_n) = \arg\min_P \sum_i w_i D(P, \hat{P}_i)$$

such that:

$$\sum_j p_j = 1; \; p_j \geq 0, \forall j$$

Among all possible probability distributions the formulation above tries to choose that distribution which minimizes a weighted divergence to all experts. The choice of weights is somewhat arbitrary and for certain instantiations of the formulation they are chosen based on heuristic arguments[1]. In the absence of this knowledge all experts will be assumed equal and thus the weights are ignored. The form of the consensus distribution depends on the choice of the divergence. Table 1 shows a summary of different divergence and the corresponding consensus distributions.

According to the invention, one factor is the preservation of unanimity and monotonicity. Weak unanimity is defined as follows. If all $\hat{P}_i$'s are equal to $P_0$, then the consensus opinion is also equal to $P_0$. Strong unanimity is defined as follows. If all $\hat{P}_i^k$'s are equal to $P_0$ for a certain value of k, then for that value of k, the consensus $P^k$ is also equal to $P_0$. According to the invention, for weak unanimity, $\hat{P}_1, \ldots, \hat{P}_n$ represents the opinions expressed by n experts and P is the learned consensus distribution. Thus, for all k, $\hat{P}_i^k = \hat{P}_j^k$; $1 \leq i, j \leq n$. That is, if all distributions are identical, then $P^k = \hat{P}_i^k$.

As will be shown shortly, strong unanimity holds only in certain cases. In particular, of the distance measures considered in Table 1, it holds only for $L_2$ norm and the particular direction of KL-distance that results in linear pooling. In all other cases it does not hold. According to the invention, for strong unanimity, $\hat{P}_1, \ldots, \hat{P}_n$ represents the opinions expressed by n experts and P is the learned consensus distribution. Therefore, for some k, $\hat{p}_i^k = \hat{p}_j^k$; $1 \leq i, j \leq n$. For KL divergence $D(\hat{P}_i, P)$, then $p^k = \hat{p}_i^k$. For other $D_y$ divergences $p^k \neq \hat{p}_i^k$.

Another desirable property of consensus distributions is monotonicity. Strong monotonicity is defined as follows. When an expert changes his opinion in a certain direction with all other expert opinions remaining unchanged, the consensus opinion should change in the direction of the modified expert. According to the invention, for monotonicity, $\hat{P}_1, \ldots, \hat{P}_n$ represents the opinions expressed by n experts and P is the learned consensus distribution (using one of the divergences given in Table 1). Suppose expert 1 changes his opinion $\hat{P}_1 = \hat{P}^*_1$ such that $\hat{p}^*_1{}^1 = \hat{p}_1{}^1 + \epsilon$ and $\hat{p}^*_1{}^2 = \hat{p}_1{}^2 - \epsilon$ while his opinion remains unchanged for all other values; i.e., $\hat{p}^*_1{}^k = \hat{p}_1{}^k$ for k>2. All of the other experts' opinions are

TABLE 1

Different divergences and the corresponding consensus pooling operator

| Divergence | Consensus Opinion | Weak Unanimity | Strong Unanimity | Monotonicity |
|---|---|---|---|---|
| $D_\gamma(P, Q) = \dfrac{1 - \sum_j p_j^\gamma q_j^{\gamma-1}}{\gamma(1-\gamma)}$ | $q_i = \dfrac{1}{Z}\left(\sum_j \alpha_j (p_i^j)^\gamma\right)^{\frac{1}{\gamma}}$ | ✓ | X | ✓ |
| $D_{KL}(P, Q) = \sum_j p_j \log \dfrac{p_j}{q_j}$ | $q_i = \sum_j \alpha_j p_i^j$ | ✓ | ✓ | ✓ |
| $D_{KL}(Q, P) = \sum_j q_j \log \dfrac{q_j}{p_j}$ | $q_i = \dfrac{1}{Z} \prod_j (p_i^j)^{\alpha_j}$ | ✓ | X | ✓ |
| $L_2(P, Q) = \sum_j (p_j - q_j)^2$ | $q_i = \sum_j \alpha_j p_i^j$ | ✓ | ✓ | ✓ |
| $\chi^2(P, Q) = \sum_j \dfrac{(p_j - q_j)^2}{q_j}$ | $q_i = \dfrac{1}{Z} \dfrac{1}{\sum_j \frac{\alpha_j}{p_i^j}}$ | ✓ | X | ✓ |
| $\chi^2(Q, P) = \sum_j \dfrac{(p_j - q_j)^2}{p_j}$ | $q_i = \dfrac{1}{Z} \sqrt{\sum_j \alpha_j (p_i^j)^2}$ | ✓ | X | ✓ |

Since an aggregated opinion is being sought it is necessary that the resultant distribution satisfy certain properties.

assumed to be unchanged. In this case if P and P* are the consensus opinions before and after the change of expert 1,then $p^{*1} > p^1$ and $p^{*2} < p^2$.

In an example illustrating the inventive concepts, suppose there opinions for a topic T=t are obtained from different sources G=g. In practice, empirical distributions $\hat{P}(S|t, g)$ can be observed. These empirical distributions can be estimated from the ratings given by users. Alternatively, sentiment analysis of text can provide data to estimate these empirical distributions. The task is to obtain a P(S|t), that is a distribution over sentiments/opinions for a given topic. Clearly, interpreting P(S|t,g) from each g as individual experts one could use conventional operators such as LinOp or LogOp to provide a consensus. However, this simple approach has several drawbacks as will be seen shortly. One could also desire P(S|t,g), a smoothed opinion of $\hat{P}(S|t, g)$ using the knowledge from other sources G. These concepts are described in fuller detail next.

The distribution of sentiments about a particular topic from different sources is distinct due to an inherent bias exhibited by the population in different sources. This can be modeled by a Bayesian Network shown in FIG. 2. Given this Bayesian network, the probability distributions P(S|t) and P(S|g,t) can be computed as:

$$P(S|t) = \sum_g \sum_a P(S|a, t)P(a|g)P(g)$$

$$P(S|g, t) = \sum_a P(S|a, t)P(a|g)$$

This BN can be interpreted as follows. Inherent in the structure of the network is the assumption that populations across different sources exhibit similar behaviors that influence their opinions. These common behaviors are captured by the latent variable A. To be consistent with the OLAP framework the variables are divided into three categories: Measures are the sentiment $S \in \{1, \ldots, K\}$; Intrinsic dimensions are the topic T; and Extrinsic dimensions are the source G.

In addition to capturing the dependency structure, the model-based approach of the invention also addresses the problem of sparsity. For example, consider the situation where the topic T takes two values $t_1$ and $t_2$, while the source variable G takes three values $g_1$, $g_2$ and $g_3$. Further, suppose that empirical distributions for $\hat{P}(S|T, G)$ are not available for the combination of $(t_2, g_3)$. Conventional opinion pooling will provide P(S|T) using the available empirical distributions. On the other hand the invention's model-based approach will "learn" P(S|T, G) including P(S|T=$t_2$, G=$g_2$) and use them to provide a consensus opinion. An added advantage of the invention's approach is the characteristics of different sources P(A|G=g) which itself can serve as valuable information in market analysis.

Next, with regard to the learning Bayesian Network as implemented by the invention, the structure of the BN is assumed to be known from domain experts. The parameters that need to be learned are the conditional probability tables indexed $\Theta = \{P(S|a,t), P(a|g)\}$. Moreover, the probabilities P(g) need to be specified. These can be estimated from data; i.e., the percentage of data available from each geography or supplied by an expert. For example, the invention uses available empirical distributions over the opinions for different topics from different geographical locations. Then, the invention formulates the parameter learning problem for the Bayesian network as the following optimization problem where the constraint captures the dependency of the network:

$$\Theta = \arg \min_\Theta \sum_{t,g} D_{KL}(\hat{P}(S|t, g), P(S|t, g)) \quad (2)$$

such that $$P(S|t, g) = \sum_a P(S|a, t)P(a|g)$$

This objective function aims at learning a BN such that the probability distribution according to the network closely matches the observed probability distribution. The particular choice of the KL divergence allows one to use an expectation maximization methodology to learn the parameters of the network. There is also a maximum likelihood interpretation to the optimization problem shown above:

$$\Theta = \arg \max_\Theta \sum_{t,g} \hat{P}(S|t, g) \log P(S|t, g)$$

An important characteristic of the extrinsic dimensions is that they are often arranged in a hierarchy. An example of source hierarchy is provided in FIG. 4. A requirement of BI reporting is the ability to provide consensus opinions at various levels of the hierarchy. For example, consensus opinions maybe desired at $g_1$ and this would be equivalent to evaluating P(S|t, $g_1$). An equally important requirement is the presence of multiple extrinsic dimensions. Consider the situation where the query of interest is "Show opinions of product X by Source and Date." To accommodate such queries the model given in FIG. 2 needs to be enhanced. Hierarchical arrangement of the extrinsic dimensions is accomplished in a simple manner. Consider FIG. 3 where the source variable G (from FIG. 1) has been replaced by a two level hierarchy corresponding to the one shown in FIG. 4. This enhanced BN has additional parameters that correspond to P(a|$G_1$) and P($G_1$|$G_2$).

Additional extrinsic dimensions can also be added by the addition of more latent variables. The actual topology of the network with the addition of these extrinsic dimensions and latent variables are dependent on the specifics of the problem. For example, if it is believed that the new extrinsic dimension (F) is independent of the existing one then the corresponding BN would have a topology similar to the one shown in FIG. 3. This addition increases the complexity of the learning methodology of the invention, as more parameters need to be estimated. However, an efficient expectation maximization methodology can still be derived for the enhanced model provided by the invention. The optimization problem corresponding to the BN shown in FIG. 3.

$$\Theta = \arg \min_\Theta \sum_{t, g_2, f_2} D_{KL}(\hat{P}(S|t, g_2, f_2), P(S|t, g_2, f_2))$$

such that $$P(S|t, g_2, f_2) = \sum_{a,b,g_1,f_1} P(S|a, b, t)P(a|g_1)P(g_1|g_2)P(b|f_1)P(f_1|f_2)$$

As discussed earlier, the latent variable A along with its cardinality |A| plays an important role in proving the properties mathematically indicated above. For example, let |A| denote the number of distinct values taken by a. The following four cases are instructive. First, when |A|=1: This extreme case reduces to the formulation of standard opinion pooling, wherein a single distribution for each topic is learned and as such all of the results that were earlier described for KL-divergence still hold. Second, when |A|=|G|: In this other extreme case the solution that will minimize the divergence 2 is the one which assigns one value of a to each geographical location thus obtaining a value of 0 for the cost function. Essentially, the distributions for each geographical location are treated independent of each other. Thus all the properties that were proved earlier can easily be extended to this case. Third, when |A|>|G|: This can be reduced to Case 2. Fourth, when 1<|A|<|G|: This is the most interesting case, as here the opinions for different geographical locations are constrained. It is easy to see that weak unanimity still holds as the global minimum solution can be modeled by this constrained set.

Proving monotonicity is more involved since the explicit expressions, such as those provided in Table 1, are no longer available. Thus, weak monotonicity is defined for this case, wherein the empirical distribution for a particular topic and geographical location change as follows. The probability for a certain value of sentiment increases while that for another value decrease. Weak monotonicity holds, if the consensus distribution for that geographical location changes in such a way that it respects the changes in the empirical distribution. Mathematically, suppose $\hat{P}(S=1|t, g)$ increases and $\hat{P}(S=2|t, g)$ decreases then monotonicity for P(S|t, g) holds if one of the following conditions is satisfied: 1) P(S=|t, g) increases; or 2) P(S=2|t, g) decreases. In contrast, strong monotonicity holds if both conditions are satisfied: 1) P(S=1|t, g) increases; and 2) P(S=2|t, g) decreases. Weak monotonicity holds always (in the constrained BN case) and strong monotonicity holds if |S|=2 (sentiment takes only two distinct values). The following expressions prove the result.

Given a set of empirical probability distributions $\{\hat{P}_1, \ldots, \hat{P}_n\}$. Furthermore, given $\hat{P}_i = \{\hat{p}_i^1, \hat{p}_i^2, \ldots, \hat{p}_i^K\}$, where $\hat{p}_i^k = \hat{P}_i(S=k)$. Then, the optimization problem being solved is $$BN = \arg\min_{BN} \sum_i D(\hat{P}_i, P_i) \quad (3)$$

where $P_i = P(S|g=g_i, t=t_i)$ and $g_i$, $t_i$ are the location and topic corresponding to $i^{th}$ empirical distribution. These probabilities $P_i$ correspond to BN over whose parameters minimization is being performed. Now let some expert changes opinion in such a way that the empirical distributions $\hat{P}_1$ changes to $\hat{P}^*_1$ where they are related as:

$$\hat{P}^*_1 = \{\hat{p}_1^1 + \epsilon, \hat{p}_1^2 - \epsilon, \hat{p}_1^3 \ldots, \hat{p}_1^K\}.$$

That is, the probability of the first two components for the first probability vector is changed. Assuming $P_1$ is the optimal vector in the original case and $P^*_1$ is the vector in the case when $\epsilon \neq 0$. Then, if $p^*_1{}^1 = p_1^1 + a$ and $p^*_1{}^2 = p_1^2 - b$, then at least one of a, b is positive. That is the new distribution should respect the changed opinion. This results in weak monotonicity.

Figure 5A:
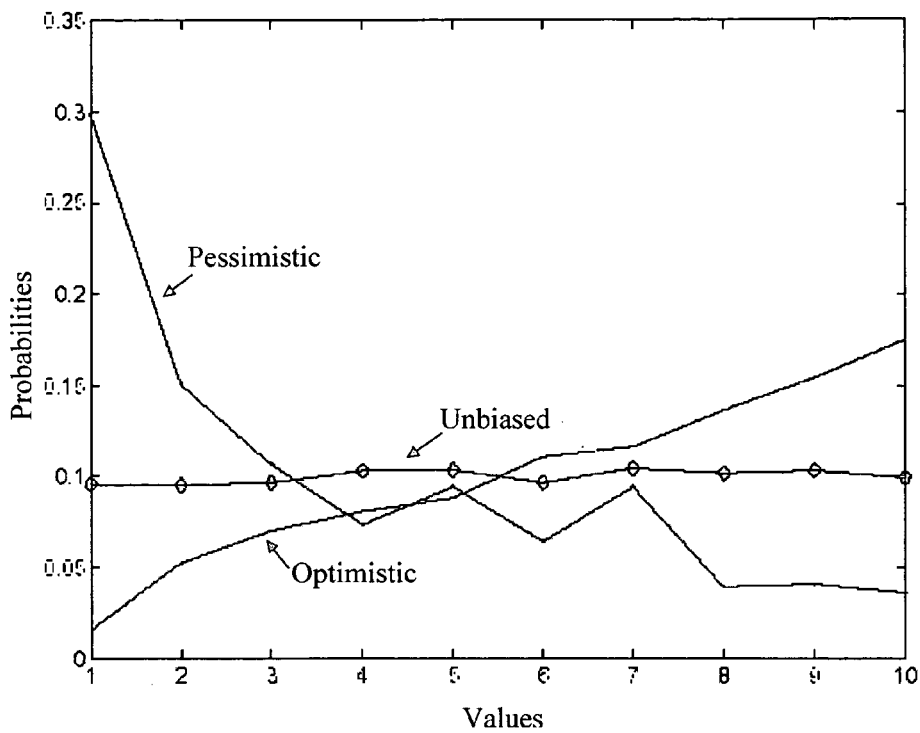
FIG. 5(a) is a graphical representation illustrating the optimistic, pessimistic, and unbiased behaviors according to an opinion pooling experiment conducted in accordance with an embodiment of the invention.
Figure 5B:
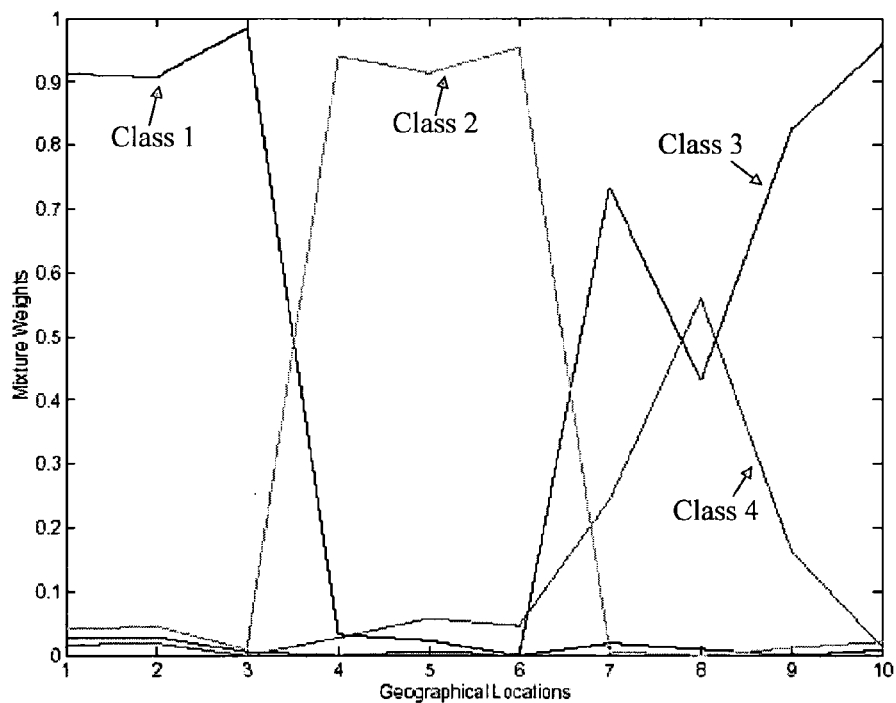
FIG. 5(b) is a graphical representation illustrating the plot of mixture coefficients P(a|g) according to an opinion pooling experiment conducted in accordance with an embodiment of the invention.

Experiments have been conducted to test the validity of the methodology provided by the invention. Broadly, the experiments are divided into three categories to evaluate the following characteristics of the invention's model: (a) ability of the model to capture behavioral similarities across extrinsic dimensions; (b) robustness to data sparsity; and (c) smoothing effect provided by the learned distribution. The BN model used for this set of experiments is over three random variables {S, A, G} with joint distribution factored as P(S, A, G)=P(A|G)P(S|A). For the first experiment synthetic data is generated for a single topic from multiple geographical locations; for example, 10 locations. The data is generated to reflect three behaviors: optimistic, pessimistic, and unbiased whose distribution over sentiments is shown in FIG. 5(a). Furthermore, three regions are assumed to have an optimistic behavior, three regions pessimistic, and the remaining four are assumed to exhibit unbiased behavior. The EM methodology is started from a random initialization of the parameters. To test the robustness of the model structure, A is chosen to have a cardinality of 4. FIG. 5(b) shows the learned mixture coefficients P(a|g). As shown in FIG. 4(b), the invention "learned" the existence of three main behaviors indicated by the overlap between the class 3 and 4 curves on the right side of FIG. 5(b).

Figure 5C:
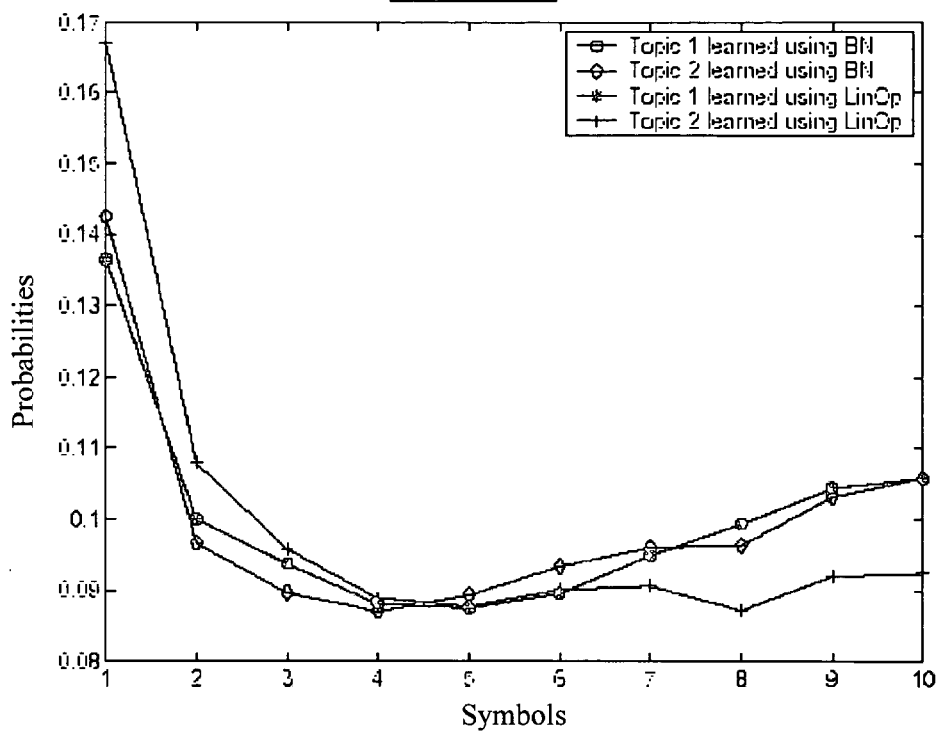
FIG. 5(c) is a graphical representation illustrating the results of a sparsity experiment conducted in accordance with an embodiment of the invention.
Figure 6:
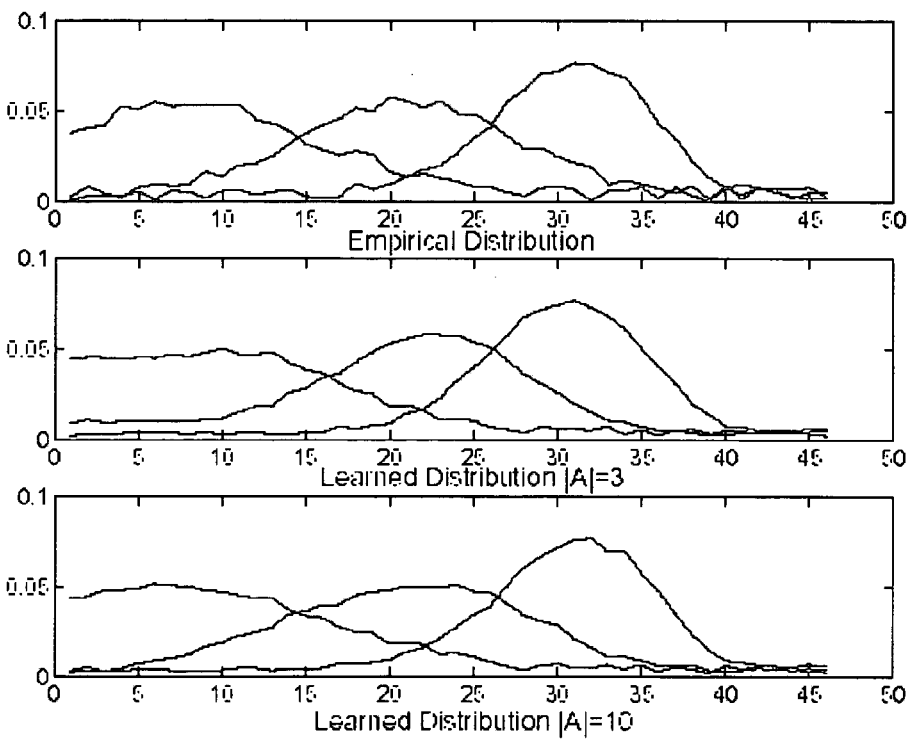
FIG. 6 is a graphical representation illustrating the results of empirical and learned distributions generated from results of an opinion pooling experiment conducted in accordance with an embodiment of the invention.

Testing robustness to data sparsity is performed using the following experiment. Data is generated for 2 topics (Topic 1 Topic 2) again from 10 geographical locations. The learning methodology of the invention uses only a portion of the empirical distributions. Specifically, empirical distributions from all geographic locations are used from Topic 1, while only five of the empirical distributions from Topic 2 are used. FIG. 5(c) shows the learned distributions of sentiment for each of the two topics. As shown in FIG. 5(c), for Topic 1 the results of the conventional LinOp method and the invention's model-based approach are identical. However, there is a discrepancy between the consensus distributions of the two approaches (conventional vs. invention) for Topic 2. The model-based approach still manages to learn reasonably well while, as the number of symbols increase, whereas in the conventional LinOp, there is a deviation from the ground truth, which is the point distribution learned using all the data. The final experiment to test the smoothing effect is performed on synthetic data generated for twenty geographical locations. The empirical distribution for each geographical location is generated from distinct beta distributions. FIG. 6 shows the empirical $\hat{P}(S|t, g)$ and the learned distributions for |A|=3 and |A|=10. As the cardinality of A increases it is shown that the learned distribution is more jagged. This is useful as it reduces the small sample effects.

For evaluating the model on real world data, opinions about laptop computers are collected from several sources on the Web: Epinions, Cnet, Zdnet, and Ciao. Each laptop is described by several characteristics for different dimensions (scope). For these experiments, there was a concentration on company name, model and processor speed. For anonymity purposes, the company names and models are given as X, X' and Y, Y', respectively. A total of 2180 opinions, $\hat{P}(\bullet)$, with 108 distinct characteristics, are collected from the different sources. The structure of the BN is chosen based on expert knowledge. To evaluate model robustness to data sparsity the dataset is divided into a 70/30 training/test split. For each characteristic, a ground truth is defined by using LinOp over all the datapoints (ignoring the split) sharing this characteristic. The BN was learned using 70% of the data. For comparison a LinOp based consensus opinion was obtained for each characteristic using the appropriate opinions from the training split. The average KL distance between the ground truth and model based approach is found to be 0.0439 whereas the KL distance between ground truth and LinOp is 0.0302. This suggests that, indeed, there is information to be learned from other opinions while providing an aggregate opinion. The predicative ability of the BN is tested on opinions for characteristics that do not appear in the training set. The LinOp is unable to provide an answer in such cases. Table 2 shows the results of the opinion experiment. Table 3 shows the symmetric version of KL-divergences between all pairs of P(A|Source). The symmetric version of the KL-divergence between two distributions p and q is given as KL(p,q)+KL(q,p). The divergence between sources Caio and ZDnet is found to be the lowest. The lower value of divergence implies similarity in behavior.

TABLE 2

Predictive ability of BN for unseen characteristics

| Source | Brand | Model | Speed | $\hat{P}(S|\cdot)$ | $P(S|\cdot)$ |
| --- | --- | --- | --- | --- | --- |
| Epinions | X | X' | 266 MHz | [0.9 0.1] | [0.8907 0.1093] |
| Zdnet | Y | Y' | 667 MHz | [0.8 0.2] | [0.811 0.189] |

TABLE 3

KL divergence between all pairs of P(A | Source)

| | Epinions | Cnet | ZDnet | Caio |
| --- | --- | --- | --- | --- |
| Epinons | — | 0.3425 | 0.4030 | 0.466 |
| Cnet | | — | 0.111 | 0.3757 |
| ZDnet | | — | — | 0.0867 |

Figure 7:
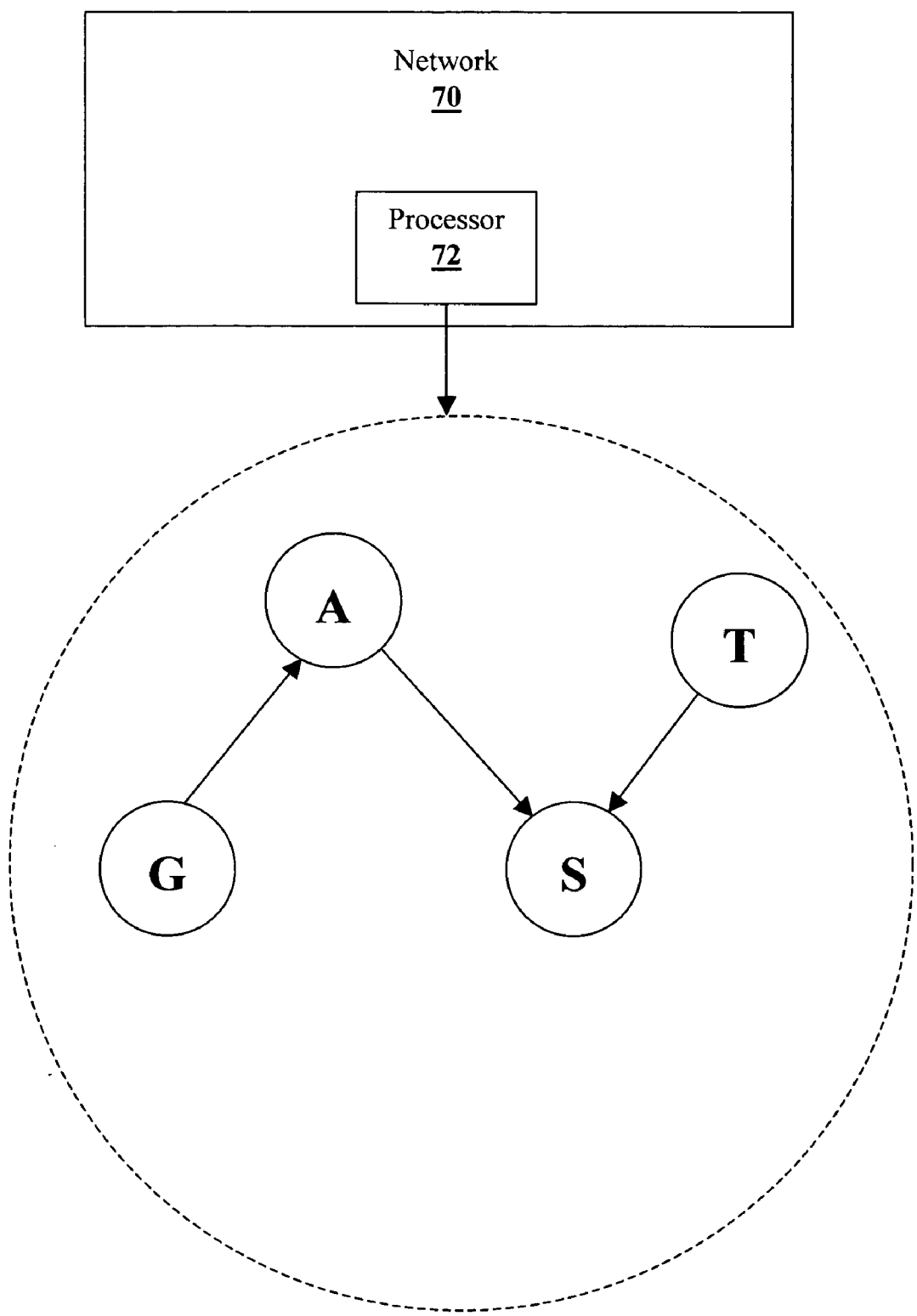
FIG. 7 is a system diagram according to an embodiment of the invention.

A system for practicing the invention illustrated in FIG. 7, wherein a system for aggregating opinions comprising means for consolidating a plurality of expressed opinions on various dimensions of topics as discrete probability distributions, and means for generating an aggregate opinion as a single point probability distribution by minimizing a sum of weighted divergences between a plurality of the discrete probability distributions.

Specifically, the system comprises a network 70 operable for consolidating a plurality of expressed opinions on various dimensions of topics as discrete probability distributions, and a processor 72 operable for generating an aggregate opinion as a single point probability distribution by minimizing a sum of weighted divergences between a plurality of the discrete probability distributions, wherein the processor 72 presents the aggregate opinion as a Bayesian network.

A representative hardware environment for practicing the present invention is depicted in FIG. 8, which illustrates a typical hardware configuration of an information handling/computer system in accordance with the invention, having at least one processor or central processing unit (CPU) 10. The CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 24, microphone 22, and/or other user interface devices such as a touch screen device (not shown) to bus 12, communication adapter 20 for connecting the information handling system to a data processing network, and display adapter 21 for connecting bus 12 to display device 23. A program storage device readable by the disk or tape units is used to load the instructions, which operate the invention, which is loaded onto the computer system.

The invention provides a probabilistic framework that enables the presentation of a consensus of opinions or other measures over hierarchies and multiple dimensions in a consistent fashion. The inherent uncertainty is retained in simple probability distributions. These distributions are combined to give consensus opinions. Furthermore, the system uses information from different sources to identify similarities between sources. This has two distinct advantages. The first advantage is the ability to obtain better estimates of consensus opinions, and the second advantage is the sparse data that is accounted for by using sources that are similar. Moreover, the source can be replaced by other dimensions and a consensus over multiple dimensions can be used to obtain consensus opinions.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

REFERENCES

[1] Maynard-Reid II, P. et al., "Aggregating learned probabilistic beliefs," In Proc. of the 17th Conf. on Uncertainty in Artificial Intelligence," UAI-01, 354–361, 2001.

[2] Pennock, D. M. et al., "Graphical representations of consensus belief, "In Proc." of the 15th Conf. on Uncertainty in Artificial Intelligence,"UAI-99, 531–540, 1999.

[3] Stone, M., "The opinion pool," Annals of Mathematical Statistics, 32:1339–42, 1961.

[4] Lindley, V. D., "Reconciliation of discrete probability distributions," Bayesian statistics, 2:375–390, 1985.

[5] Dempster, A. et al., "Maximum likelihood from incomplete data via the EM algorithm," Journal of the Royal Statistical Society, B, 1977.

[6] French, S., "Group consensus probability distributions: A critical survey," Bayesian statistics, 2:183–202, 1985.

[7] Genest, C. et al., "Combining probability distributions: A critique and an annotated bibliography (avec discussion)," Statistical Science, 1:114–148, 1986.

[8] Zhu, H. et al., "Information geometric measurements of generalization," Technical Report NCRG4350, Dept. Comp. Sci. and Appl. Math., Aston University, August 1995.

What is claimed is:

1. A method of aggregating opinions, said method comprising:
   consolidating a plurality of expressed opinions on various dimensions of topics as discrete probability distributions; and
   generating an aggregate opinion as a single point probability distribution by minimizing a sum of weighted divergences between a plurality of said discrete probability distributions.

2. The method of claim 1, wherein said divergences comprise Kullback-Liebler distance divergences.

3. The method of claim 1, wherein said expressed opinions comprise opinions on sentiments of products and services.

4. The method of claim 3, wherein said aggregate opinion predicts success of said products and services.

5. The method of claim 1, wherein said expressed opinions are generated by experts.

6. The method of claim 5, wherein said experts are arranged in a hierarchy of knowledge, wherein said knowledge comprises said various dimensions of topics for which opinions may be expressed upon.

7. The method of claim 1, further comprising presenting said aggregate opinion as a Bayesian network.

8. A method of pooling opinions, said method comprising:
representing a plurality of expressed opinions received from a plurality of sources on various dimensions of topics as discrete probability distributions;
creating a single point probability distribution by minimizing a sum of weighted divergences between a plurality of said discrete probability distributions; and
generating an aggregate opinion based on said single point probability distribution.

9. The method of claim 8, wherein said divergences comprise Kullback-Liebler distance divergences.

10. The method of claim 8, wherein said expressed opinions comprise opinions on sentiments of products and services.

11. The method of claim 10, wherein said aggregate opinion predicts success of said products and services.

12. The method of claim 8, wherein said expressed opinions are generated by experts.

13. The method of claim 12, wherein said experts are arranged in a hierarchy of knowledge, wherein said knowledge comprises said various dimensions of topics for which opinions may be expressed upon.

14. The method of claim 8, further comprising presenting said aggregate opinion as a Bayesian network.

15. A system for aggregating opinions comprising:
a network operable for consolidating a plurality of expressed opinions on various dimensions of topics as discrete probability distributions; and
a processor operable for generating an aggregate opinion as a single point probability distribution by minimizing a sum of weighted divergences between a plurality of said discrete probability distributions.

16. The system of claim 15, wherein said divergences comprise Kullback-Liebler distance divergences.

17. The system of claim 15, wherein said expressed opinions comprise opinions on sentiments of products and services.

18. The system of claim 17, wherein said aggregate opinion predicts success of said products and services.

19. The system of claim 15, wherein said expressed opinions are generated by experts.

20. The system of claim 19, wherein said experts are arranged in a hierarchy of knowledge, wherein said knowledge comprises said various dimensions of topics for which opinions may be expressed upon.

21. The system of claim 1, wherein said processor presents said aggregate opinion as a Bayesian network.

22. A system for aggregating opinions comprising:
means for consolidating a plurality of expressed opinions on various dimensions of topics as discrete probability distributions; and
means for generating an aggregate opinion as a single point probability distribution by minimizing a sum of weighted divergences between a plurality of said discrete probability distributions.

23. A program storage device readable by computer, tangibly embodying a program of instructions executable by said computer to perform a method of aggregating opinions, said method comprising:
consolidating a plurality of expressed opinions on various dimensions of topics as discrete probability distributions; and
generating an aggregate opinion as a single point probability distribution by minimizing a sum of weighted divergences between a plurality of said discrete probability distributions.

24. The program storage device of claim 23, wherein said divergences comprise Kullback-Liebler distance divergences.

25. The program storage device of claim 23, wherein said expressed opinions comprise opinions on sentiments of products and services.

26. The program storage device of claim 25, wherein said aggregate opinion predicts success of said products and services.

27. The program storage device of claim 23, wherein said expressed opinions are generated by experts.

28. The program storage device of claim 27, wherein said experts are arranged in a hierarchy of knowledge, wherein said knowledge comprises said various dimensions of topics for which opinions may be expressed upon.

29. The program storage device of claim 23, wherein said method further comprises presenting said aggregate opinion as a Bayesian network.

* * * * *